(12) United States Patent
Hardig et al.

(10) Patent No.: US 6,454,298 B1
(45) Date of Patent: Sep. 24, 2002

(54) LOW VOLUME ROOF RAIL AIR BAG

(75) Inventors: Connie M. Hardig, Cincinnati; Margaret Ann Fisher, Huber Heights, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/804,048

(22) Filed: Mar. 12, 2001

(51) Int. Cl.$^7$ .............................................. B60R 21/22
(52) U.S. Cl. .................. 280/730.2; 280/729; 280/743.1
(58) Field of Search ........................... 280/730.2, 728.1, 280/729, 743.1

(56) References Cited

U.S. PATENT DOCUMENTS

| | | |
|---|---|---|
| 5,788,270 A | 8/1998 | HÅland et al. |
| 6,073,961 A | 6/2000 | Bailey et al. |

*Primary Examiner*—Paul N. Dickson
*Assistant Examiner*—Toan C To

(74) *Attorney, Agent, or Firm*—Kathryn A. Marra

(57) ABSTRACT

An inflatable curtain structure for deployment within the interior of a transportation vehicle so as to cover an area adjacent to an occupant within the vehicle during a collision event. The curtain structure includes an impact surface facing towards the occupant upon inflation of the curtain structure and a rear surface facing away from the occupant upon inflation of the curtain structure. The impact surface and the rear surface are secured relative to one another such that inflation gas entering the curtain structure is substantially confined in the space between the impact surface and the rear surface. The curtain structure includes a lower edge wherein regions of substantially noninflatable character extend adjacent to said lower edge and wherein a plurality of intermittently arranged gas receiving elements of relatively low volume extend towards the lower edge between regions of substantially noninflatable character such that upon inflation of the curtain structure, a portion of the inflation gas entering the cushion structure is conveyed into the gas receiving elements thereby inflating the gas receiving elements and increasing the stiffness adjacent the lower edge of the curtain structure.

15 Claims, 2 Drawing Sheets

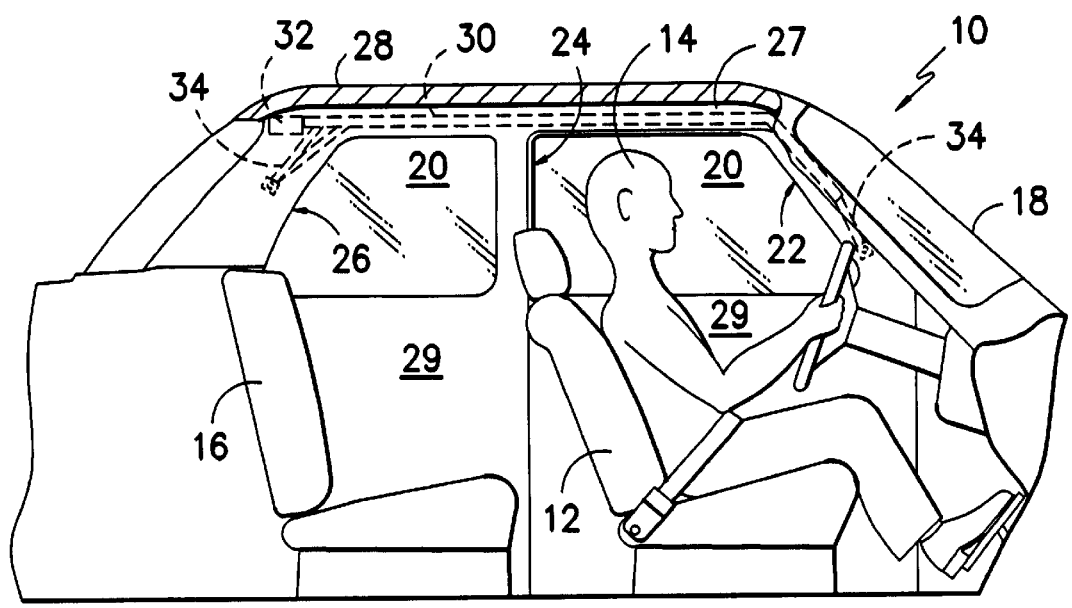
FIG. -1-
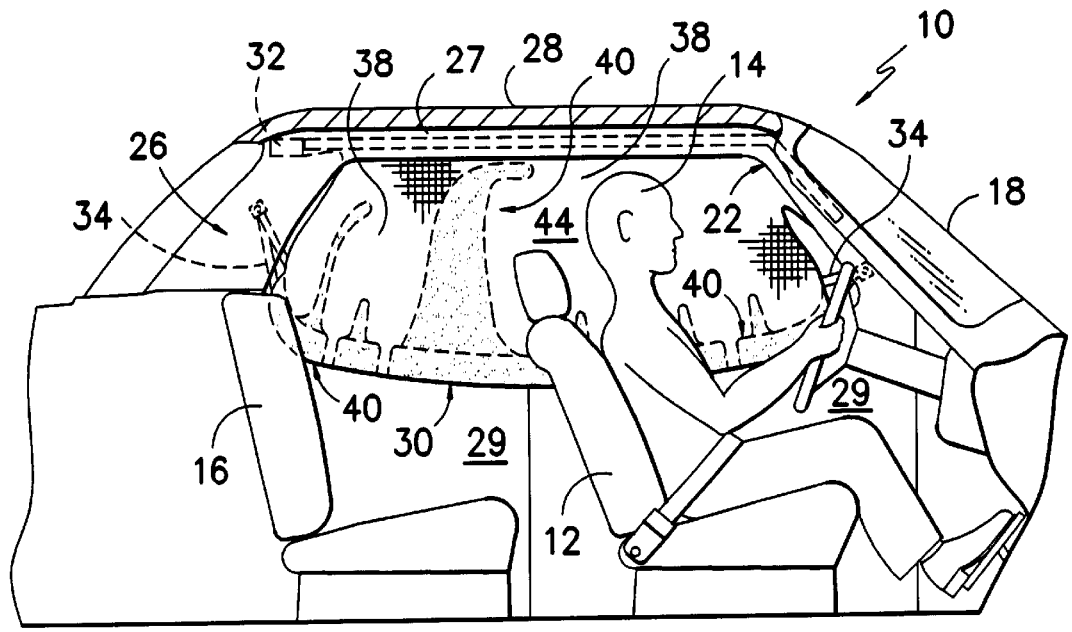
FIG. -2-

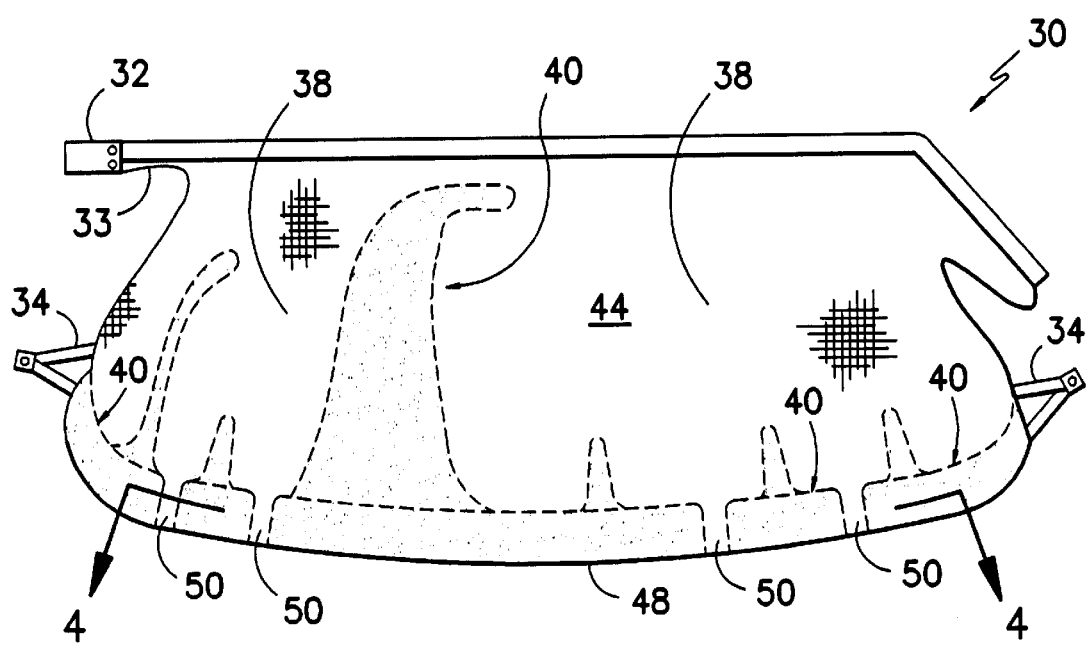
FIG. -3-
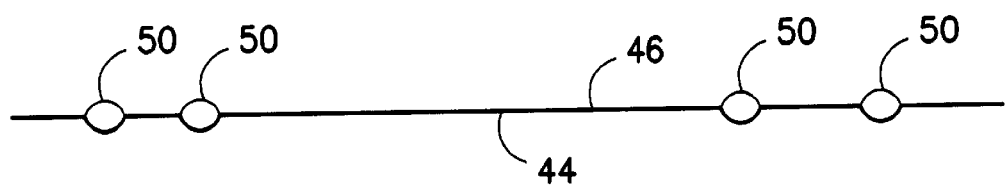
FIG. -4-

LOW VOLUME ROOF RAIL AIR BAG

TECHNICAL FIELD

The present invention relates to an inflatable air bag cushion for use in covering a side portion of a vehicle interior adjacent to an occupant to be protected during a collision event, and more particularly to an inflatable air bag cushion of substantially curtain-like structure for covering the side portion of the vehicle interior which air bag cushion is deployable from the region of the roof rail of the vehicle and which includes inflatable stiffening elements disposed in an arrangement along the lower edge of the cushion.

BACKGROUND OF THE INVENTION

It is well known in motor vehicles to provide an air bag cushion for protecting a vehicle occupant wherein the air bag cushion is in fluid communication with an inflator for generating gas to inflate the cushion upon sensing predetermined vehicle conditions such as deceleration exceeding a certain level. It is further known to provide air bag systems including inflatable restraint cushions which are deployed in substantially curtain-like fashion between an occupant to be protected and the side portions of the vehicle adjacent to such occupant so as to provide the occupant with cushioning restraint during a side impact or extended roll-over collision event.

It has recently been proposed to provide inflatable air bag cushions which are deployable from stored positions along the roof rail of the vehicle so as to extend downwardly away from the roof line of the vehicle in substantially covering relation to the side portions of the vehicle against which the occupant may otherwise be thrown during a side collision or extended roll-over event. Such deployment is effected by the introduction of an inflating gas into the air bag cushion which thereby expands the cushion and forces it to move downwardly over the portions of the vehicle to be covered.

In some instances it is believed to be desirable for the deployed air bag cushion to extend across the window openings of the vehicle so as to block the occupant of the vehicle from being ejected from the vehicle interior during a side collision or roll-over event. In such a configuration, it is desirable that the cushion assumes a substantially taut configuration across the expanse of the vehicle to be covered so as to form a substantially stable barrier between the occupant and the covered expanse.

It is believed that in those environments where a curtain-like cushion is deployed downwardly over some portion of the window openings in a vehicle, the desired taut orientation over the covered expanse may be achieved to some degree by filling the air bag cushion with inflation gas which thereby tends to shorten the overall length of the cushion as available material expands outwardly. However, it has been found that as the area of coverage is increased, the volume of gas which is required to inflate and thereby stiffen the entire cushion structure may dictate the use of a prohibitively large volume of inflation gas. Moreover, the inflation gas which fills the lowermost portions of the air bag may provide little benefit to the occupant to be protected since in such regions the air bag cushion is intended to provide a primarily restraining rather than a cushioning function. Thus, if the curtain is to cover a significant expanse, prior configurations may require the use of significant volumes of inflation gas which may exceed the capacity of some inflators.

SUMMARY OF THE INVENTION

This invention provides advantages and alternatives over the prior art by providing an air bag cushion which is deployable in curtain-like fashion across the sides of a vehicle interior over an expansive area adjacent to the occupant to be protected. The air bag cushion may be expanded to a taut orientation without utilizing extensive quantities of inflation gas. In particular, the air bag cushion of the present invention may be deployed from a storage position along the roof rail of the vehicle downwardly over the window openings of the vehicle to assume an orientation which assists in holding an occupant within the vehicle during an extended roll-over event while at the same time reducing the volume of inflation gas utilized in the lower regions of the curtain structure.

Upon deployment of the cushion it is stiffened across its body by the inflated outward expansion thereof. However, in order to avoid the use of an extensive quantity of inflation gas, the cushion of the present invention includes segments of substantially noninflatable character which extend along the lower edge of the cushion. Inflatable elongate finger-like spacing elements extend towards the lower edge between the segments of substantially noninflatable character such that the finger-like elements are in fluid communication with the inflated interior of the curtain structure. The inflation of the cushion thereby causes the inflatable finger-like elements to inflate and thereby expand outwardly. This outward inflation of the finger-like elements provides the cushion with a requisite degree of dimensional stability adjacent the lower edge both in terms of tension and elongate stiffness such that the cushion provides a stable restraining surface across the window opening without requiring inflation of the entire structure.

Preferably, the segments of the substantially noninflatable character which extend along the lower edge of the air bag cushion are arranged in a predefined pattern below impact regions across the air bag cushion for cushioning impact of the occupant during the collision event.

In accordance with a potentially preferred aspect of the invention, the inflatable elongate finger-like elements are characterized by a low volumetric capacity relative to the volume of the impact regions across the air bag cushion such that available inflation gas is directed primarily into such impact regions.

In accordance with a potentially preferred aspect of the invention, the segments of substantially non-inflatable character which extend along the lower edge of the air bag cushion may be formed by joining together opposing panels of material forming the air bag cushion in defined patterns by seaming or other appropriate means.

Advantageously, the utilization of the low volume inflatable finger-like elements to stabilize the lower portion of the air bag cushion permits the air bag cushion to assume the desired orientation over the side portions of the vehicle while nonetheless reducing the volume of inflation gas required to assume this orientation.

BRIEF DESCRIPTION OF THE DRAWINGS

The accompanying drawings which are incorporated in and which constitute a part of this specification, illustrate a potentially preferred embodiment of the present invention and, together with the general description of the invention given above and the detailed description set forth below, serve to explain the principles of the invention wherein:

FIG. 1 is a cut-away view of the interior of an automotive vehicle incorporating a curtain-like air bag cushion according to the present invention;

FIG. 2 is a view similar to FIG. 1 wherein a curtain-like inflatable cushion according to the present invention has been deployed over side portions of a vehicle interior from the vehicle roof line to a position below the window openings in a position substantially adjacent to an occupant to be protected;

FIG. 3 illustrates a curtain-like air bag cushion according to the resent invention and including regions of substantially non-inflatable character disposed across the air bag cushion so as to reduce inflation gas requirements; and FIG. 4 is a sectional view taken along line 4—4 in FIG. 3.

While the invention has been illustrated and generally described above and will hereinafter be described in connection with certain potentially preferred embodiments and practices, it is to be understood that in no event is the invention to be limited to such illustrated and described embodiments and practices. On the contrary, it is intended that the present invention shall extend to all alternatives and modifications as may embrace the principles of this invention within the true spirit and scope thereof.

DESCRIPTION OF THE PREFERRED EMBODIMENT

Turning now to the drawings wherein to the extent possible like reference numerals are utilized to designate like components throughout the various views, in FIG. 1 there is illustrated a vehicle 10. The vehicle 10 includes a front seat 12 which may be used to support a front seated vehicle occupant 14. The vehicle 10 further includes a rear seat 16 which may be used to support a rear occupant (not shown). While the front seat 12 and the rear seat 16 are illustrated as being located on the driver's side of the vehicle 10, it is to be appreciated that the present invention is also useful in protection of an occupant (not shown) seated in either the front seat or rear seat on the passenger side of the vehicle 10.

In order to provide visibility to the occupants of the vehicle 10, the vehicle 10 is provided with a windshield 18 as well as with one or more side windows 20. As illustrated, the side windows 20 are located generally adjacent to the seats 12, 16 to the sides of the occupants seated therein. As illustrated, the vehicle 10 preferably includes a structural support frame including a series of structural support pillars 22, 24, 26 which extend downwardly from the roof rail 27 of the vehicle 10 at the intersection between the roof 28 and the doors 29. The structural support pillar 22 which extends between the windshield 18 and the side window 20 adjacent to the front seat 12 is commonly referred to as the "A" pillar. The structural support pillar 24 which is disposed intermediate the side windows 20 is commonly referred to as "B" pillar. The structural support pillar 26 which is disposed rearward of the side window 20 adjacent to the rear seat 16 is commonly referred to as the "C" pillar. As will be appreciated, each of the structural support pillars 22, 24, 26 are preferably covered by a trim piece which extends in elongate fashion towards the roof rail 27. The roof rail 27 preferably runs between the "A" pillar 22 and the "C" pillar 26 and is covered by headlining or trim material as will be well known to those of skill in the art.

As illustrated, it is contemplated that an air bag cushion in the form of an inflatable curtain structure 30 may be stored in rolled or folded relation along at least a portion of the roof rail 27. It is also contemplated that portions of the inflatable curtain structure 30 may be stored along portions of the "A" pillar 22 and/or the "C" pillar 26. The inflatable curtain structure 30 is preferably in fluid communication with a gas discharging inflator 32 as is well known to those of skill in the art such that gas may be discharged from the inflator 32 and through an inlet opening 33 (FIG. 3) within the inflatable curtain structure 30 to effect deployment of the inflatable curtain structure 30. As illustrated, the inflatable curtain structure 30 may also be attached to tethering elements 34 disposed at locations to promote the desired deployment path for the inflatable curtain structure upon inflation by the inflator 32. As will be appreciated, the inflatable curtain structure 30, inflator 32, and tethering elements 34 are preferably hidden from view by overlying trim. Thus, prior to activation of the inflatable curtain structure 30, the inflatable curtain structure and tethering elements 34 will be substantially hidden from view.

Referring now to FIG. 2, the inflatable curtain structure 30 is illustrated in an inflated deployed state in substantially covering relation to an area adjacent to the seats 12, 16. According to the illustrated and potentially preferred embodiment of the present invention, the inflatable curtain structure 30 extends across the region between the "A" pillar 22 and the "C" pillar 26 and extends downwardly such that the lower edge is below the lower boundary of the side windows 20. This lower boundary of the side windows 20 is commonly referred to as the vehicle belt line. While the inflatable curtain structure 30 is illustrated as extending substantially across the region between the "A" pillar 22 and the "C" pillar 26, it is likewise contemplated that the inflatable curtain structure 30 may be deployed over a diminished region if desired such as the region between the "A" pillar 22 and the "B" pillar 24 or between the "B" pillar 24 and the "C" pillar 26.

Regardless of the particular configuration of the inflatable curtain structure 30, it is contemplated that the inflatable curtain structure 30 will preferably provide the dual function of cushioning the head of a vehicle occupant seated adjacent to the deployed inflatable curtain structure 30 during a collision event and will further provide a restraint to mitigate possible exit of such an occupant during an extended rollover event. According to the present invention, the inflatable curtain structure 30 is thus preferably constructed to include expansible gas receiving regions 38 where cushioning impact protection for the head of the occupant is to be provided. The inflatable curtain structure 30 is also provided with substantially non-inflatable regions 40 illustrated as shaded areas wherein inflatable cushioning may not be required yet where the restraining function is nonetheless desired.

As best illustrated through simultaneous reference to FIGS. 3 and 4, the inflatable curtain structure 30 is preferably formed by joining together cooperating panels of material by patterned seaming or other appropriate joining techniques so as to form an enclosure which accepts and retains the inflation gas discharged by the inflator 32. The resultant inflatable curtain structure 30 thus includes a front impact surface 44 facing towards the vehicle interior upon inflation and a rear surface 46 in opposing relation to the front impact surface 44 such that the rear surface 46 faces substantially away from the vehicle interior upon inflation of the curtain structure 30.

The panels of material forming the impact surface 44 and the rear surface 46 are preferably of a substantially pliable nature such that the inflatable curtain structure 30 may be folded and stored in a compact manner within the roof rail 27. Textile fabrics may be preferred. Woven or knitted fabrics of nylon or polyester may be particularly preferred. The materials forming the inflatable curtain structure 30 are also preferably characterized by a low gas permeability so as to promote the retention of inflation gas during a prolonged roll-over event. It is contemplated that such low permeability characteristics may be achieved by providing a permeability blocking coating in the form of a film or dispersion of a suitable material such as silicone, polyurethane, or polyamide across the inflatable regions 38 of the curtain structure so as to prevent the permeation of inflation gas through such regions. It is also contemplated that cooperating layers of lining material such as urethane or the like may be interposed between the front impact surface 44 and the rear surface 46 so as to form an internal low permeability bladder-like element upon construction of the curtain structure 30 thereby yielding a bag in bag construction.

It is contemplated that the panels of material forming the inflatable curtain structure 30 may be formed from a single blank of material which is folded upon itself and seamed together or may be formed from two or more separate blanks of material which are arranged in the desired configuration and thereafter seamed together. It is contemplated that such seaming operations may be carried out by traditional industrial sewing techniques as well as by alternative joining techniques such as will be well known to those of skill in the art including adhesive bonding, RF welding and ultrasonic welding. It is further contemplated that the inflatable curtain structure 30 may be formed as a one piece woven construction utilizing jacquard or other weaving techniques as may be known to those of skill in the art.

As indicated, according to the illustrated and potentially preferred embodiment of the present invention, the inflatable curtain structure 30 includes non-inflatable segments 40 wherein the impact surface 44 has been joined to the rear surface 46 in a desired pattern to substantially block the introduction of inflation gas between the impact surface 44 and the rear surface 46 in those regions. It is contemplated that this joining operation may be carried out by the same procedures as may be used to enclose the inflatable curtain structure 30. As will be appreciated, the pattern of the noninflatable segments 40 across the inflatable curtain structure 30 is preferably selected so as to provide inflatable regions 38 which are characterized by an appropriate size, position and shape across the inflatable curtain structure 30 so as to provide the desired impact protection for the adjacent vehicle occupant. Thus, it is contemplated that the pattern of non-inflatable segments 40 may be varied considerably depending upon the vehicle type in which the inflatable curtain structure 30 is to be deployed.

As illustrated, regardless of the arrangement of the non-inflatable segments 40 which extend across the interior of the inflatable curtain structure 30, it is contemplated that such noninflatable segments 40 will preferably extend in a pattern which forms a series of noninflatable segments of substantial length which extend away from the lower edge 48 of the inflatable curtain structure 30. Finger-like spacers 50 extend between the noninflatable segments adjacent the length of the lower edge 48 and are in fluid communication with the impact absorbing inflatable regions 38 within the inflatable curtain structure 30. The inflatable spacers 50 preferably occupy on a cumulative basis less than about 50 percent of the distance along the lower edge 48 in comparison to the length occupied by the noninflatable segments 40 and will preferably be of a relatively low volumetric capacity such that they do not require substantial quantities of inflation gas to promote their expansion. By way of example only, and not limitation, when the inflatable curtain structure is in a substantially uninflated condition, it is contemplated that such finger-like spacers 50 may occupy a combined linear distance in the zone extending along the lower edge 48 of the curtain structure which is not greater than about 50% of the total linear distance along the lower edge 48 and will more preferably occupy a combined linear distance of about 10 percent to about 40 percent of the total linear distance along the lower edge 48 and will most preferably occupy a combined linear distance of about 15 percent to about 30 percent of the total linear distance along the lower edge 48. As will be appreciated, while in the illustrated embodiment the finger-like elements extend substantially to the lower edge 48, it is also contemplated that the finger-like elements may terminate at locations above the lower edge 48 if desired.

One configuration for the finger-like spacers 50 which may be particularly preferred is a substantially straight channel which inflates to a substantially cylindrical geometry of relatively low volume. By way of example only, it is contemplated that such channels which extend a distance of about 10 cm away from the lower edge 48 and which inflate to a diameter of about 33 mm may be useful in achieving the desired tensioning and stabilizing effects across the lower edge 48. Surprisingly, it has been found that notwithstanding such a small volumetric capacity, and the relatively small area occupied by such finger-like spacers, the present invention is nonetheless capable of providing an adequate degree of tensioning to assure a taut arrangement across the window opening 20 while at the same time providing sufficient dimensional stability across the lower edge 48 to effectively prevent the inflatable curtain structure 30 from being pushed out of position through the window opening 20 when force is applied to the impact surface 44. As will be appreciated, such tensioning and dimensional stability across the lower edge 48 may be beneficial in holding the inflatable curtain structure 30 in its desired operative position between the occupant and the covered areas thereby providing both cushioning and restraint during an extended roll-over event.

The presence of the noninflatable segments 40 extending along the lower edge 48 and into the interior of the curtain structure serves to prevent the inflation of the curtain structure in those regions where they are present. Such inflation restriction is believed to provide the dual benefits of reducing the amount of inflation gas which is required to provide a full expansion of the inflatable curtain structure 30 and allowing the inflatable curtain structure to be deployed within a shorter period of time due to the fact that a lower volume of inflation gas is required. Moreover, since the non-inflatable segments 40 are present in locations only where cushioning is not required, the benefits to the occupant are not sacrificed.

While the inflatable curtain structure 30 may take on a wide variety of constructions and configurations, it is contemplated that the utilization of the non-inflatable segments 40 extending across the lower edge 48 and towards the interior of the curtain structure 30 will provide a band adjacent to the lower edge which remains substantially uninflated except for the low volume inflatable spacers thereby leading to a substantial reduction in the volume of inflation gas required to effect deployment of the inflatable curtain structure 30. Moreover, it is contemplated that due to the relatively small volumetric capacity of the inflatable spacers 50 which extend along the lower edge 48 that virtually all of the inflation gas which enters the curtain structure 30 is directed into the inflatable regions 38 where impact protection is desired and is not wasted in regions where impact does not occur except to the extent required to promote tensioning and dimensional stability.

It is to be understood that while the present invention has been illustrated and described in relation to certain potentially preferred embodiments, constructions, and procedures, that such embodiments, constructions, and procedures are illustrative only and that the present invention is in no event to be limited thereto. Rather, it is contemplated that modifications and variations embodying the principles of this invention will no doubt occur to those of skill in the art. It is thus contemplated and intended that the present invention shall extend to all such modifications and variations as may incorporate the broad aspects of the invention within the full spirit and scope of the appended claims and all equivalents thereto.

What is claimed is:

1. An inflatable curtain structure for deployment within the interior of a transportation vehicle so as to cover an area adjacent to an occupant within the vehicle during a collision event, the inflatable curtain structure comprising:

an impact surface facing towards the occupant upon inflation of the inflatable curtain structure and a rear surface facing away from the occupant upon inflation of the inflatable curtain structure, the impact surface being secured relative to the rear surface such that inflation gas entering the inflatable curtain structure is substantially confined between the impact surface and the rear surface, the inflatable curtain structure including impact absorbing inflatable regions, the inflatable curtain structure including a lower edge including segments of substantially noninflatable character disposed along the lower edge and a plurality of elongate gas receiving elements in fluid communication with the impact absorbing inflatable regions within the inflatable curtain structure and extending below the impact absorbing inflatable regions within the inflatable curtain structure such that upon inflation of the inflatable curtain structure, a portion of the inflation gas entering the inflatable curtain structure is conveyed into the elongate gas receiving elements thereby increasing the stiffness of the inflatable curtain structure adjacent to the lower edge, wherein the elongate gas receiving elements are disposed in substantially normal relation to the lower edge of the inflatable curtain structure at discrete locations along tile length of the lower edge such that the elongate gas receiving elements collectively occupy no more than about 50 percent of the total length along the lower edge when the inflatable curtain structure is in a noninflated condition.

2. The invention according to claim 1, wherein the elongate gas receiving elements collectively occupy about 10 percent to about 40 percent of the total length along the lower edge when the inflatable curtain structure is in a noninflated condition.

3. The invention according to claim 1, wherein the elongate gas receiving elements collectively occupy about 20 percent to about 30 percent of the total length along the lower edge when the inflatable curtain structure is in a noninflated condition.

4. The invention according to claim 1, wherein the impact surface and the rear surface comprise panels of textile material.

5. The invention according to claim 4, wherein the panels of textile material include a permeability blocking coating.

6. The invention according to claim 5, wherein at least a portion of the segments of substantially noninflatable character are formed by joining together the impact surface and the rear surface in a predetermined pattern.

7. The invention according to claim 1, wherein the elongate gas receiving elements are inflatable to a substantially cylindrical character.

8. An inflatable curtain structure for deployment within the interior of a transportation vehicle so as to cover an area adjacent to an occupant within the vehicle during a collision event, the curtain structure comprising:

an impact surface facing towards the occupant upon inflation of the curtain structure and a rear surface facing away from the occupant upon inflation of the curtain structure, the impact surface being secured relative to the rear surface so as to form an enclosure such that inflation gas entering the curtain structure is substantially confined between the impact surface and the rear surface, the curtain structure including impact absorbing inflatable regions extending in a predetermined pattern across the curtain structure wherein the inflation gas is confined and regions of substantially noninflatable character extending in a predetermined pattern across the curtain structure, the curtain structure including a lower edge wherein a portion of the regions of substantially noninflatable character extend adjacent to said lower edge and wherein a plurality of intermittently arranged gas receiving elements extend towards the lower edge between regions of substantially noninflatable character, the gas receiving elements being in fluid communication with one or more impact absorbing inflatable regions within the curtain structure such that upon inflation of the curtain structure, a portion of the inflation gas entering the curtain structure is conveyed into the gas receiving elements thereby inflating the gas receiving elements and increasing the stiffness adjacent the lower edge of the curtain structure, the gas receiving elements occupying a smaller cumulative linear distance along the lower edge than the cumulative linear distance occupied by said portion of the regions of substantially noninflatable character extending adjacent to the lower edge.

9. The invention according to claim 8, wherein the gas receiving elements are inflatable to a substantially elongate cylindrical configuration.

10. The invention according to claim 9, wherein the gas receiving elements are disposed in substantially normal relation to the lower edge of the curtain structure at discrete locations along the length of the lower edge such that the gas receiving elements collectively occupy about 10 percent to about 40 percent of the total length along the lower edge when the inflatable curtain structure is in a noninflated condition.

11. The invention according to claim 10, wherein the gas receiving elements collectively occupy no more than about 30 percent of the total length along the lower edge when the inflatable curtain structure is in a noninflated condition.

12. The invention according to claim 8, wherein the impact surface and the rear surface comprise panels of textile material.

13. The invention according to claim 12, wherein the panels of textile material include a permeability blocking coating.

14. The invention according to claim 13, wherein the impact surface and the rear surface are secured in place relative to one another by patterned welding.

15. The invention according to claim 8, wherein the impact surface and the rear surface comprise a single piece of material.

* * * * *